United States Patent [19]

Ishida

[11] Patent Number: 5,270,129
[45] Date of Patent: Dec. 14, 1993

[54] SOLID OXIDE FUEL ELECTRODES AND PROCESS FOR PRODUCING THE SAME

[75] Inventor: Yoshihiko Ishida, Nagoya, Japan
[73] Assignee: NGK Insulators, Ltd.
[21] Appl. No.: 858,048
[22] Filed: Mar. 26, 1992

[30] Foreign Application Priority Data

Mar. 27, 1991 [JP] Japan .................................. 3-85839

[51] Int. Cl.[5] .............................................. H01M 8/12
[52] U.S. Cl. ......................................... 429/32; 429/38; 427/115
[58] Field of Search ....................... 429/30, 32, 33, 38; 427/115

[56] References Cited

U.S. PATENT DOCUMENTS

| | | | |
|---|---|---|---|
| 4,476,197 | 10/1984 | Herceg | 429/32 |
| 4,816,036 | 3/1989 | Kotchik | 429/30 X |
| 4,883,497 | 11/1989 | Claar et al. | 429/33 X |
| 4,988,582 | 1/1991 | Dyer | 429/32 X |

Primary Examiner—Stephen Kalafut
Attorney, Agent, or Firm—Parkhurst, Wendel & Rossi

[57] ABSTRACT

A solid oxide fuel cell comprising a separator plate made of a material having stability against oxidation and reduction and electronic conductivity, an air electrode spacer made of a material having oxidation resistance and electronic conductivity, a flat plate-shaped solid oxide fuel cell element, a fuel electrode spacer, and another separator plate made of a material having oxidation resistance, reduction resistance and electronic conductivity, and another separator plate. The separator plate, the air electrode spacer, the solid oxide fuel cell element, the fuel electrode spacer and another separator plate are successively laminated in this order. The solid oxide fuel cell element including an ion-conductive ceramic plate, and an air electrode and a fuel electrode formed on opposite surfaces of said ceramic plate, respectively. An oxidizing gas chamber is defined by the separator plate, the air electrode spacer and the element, and a fuel gas chamber is defined by the element, the fuel electrode spacer, and another separator plate. A process for producing such a solid oxide fuel cell comprises the steps of forming the ion-conductive ceramic plate by sintering, forming the air electrode and a fuel electrode on opposite surfaces of the ceramic plate, respectively, and successively laminating the separator plate, the air electrode spacer, the solid oxide fuel cell element, the fuel electrode spacer and another separator plate in this order.

7 Claims, 6 Drawing Sheets

FIG_3

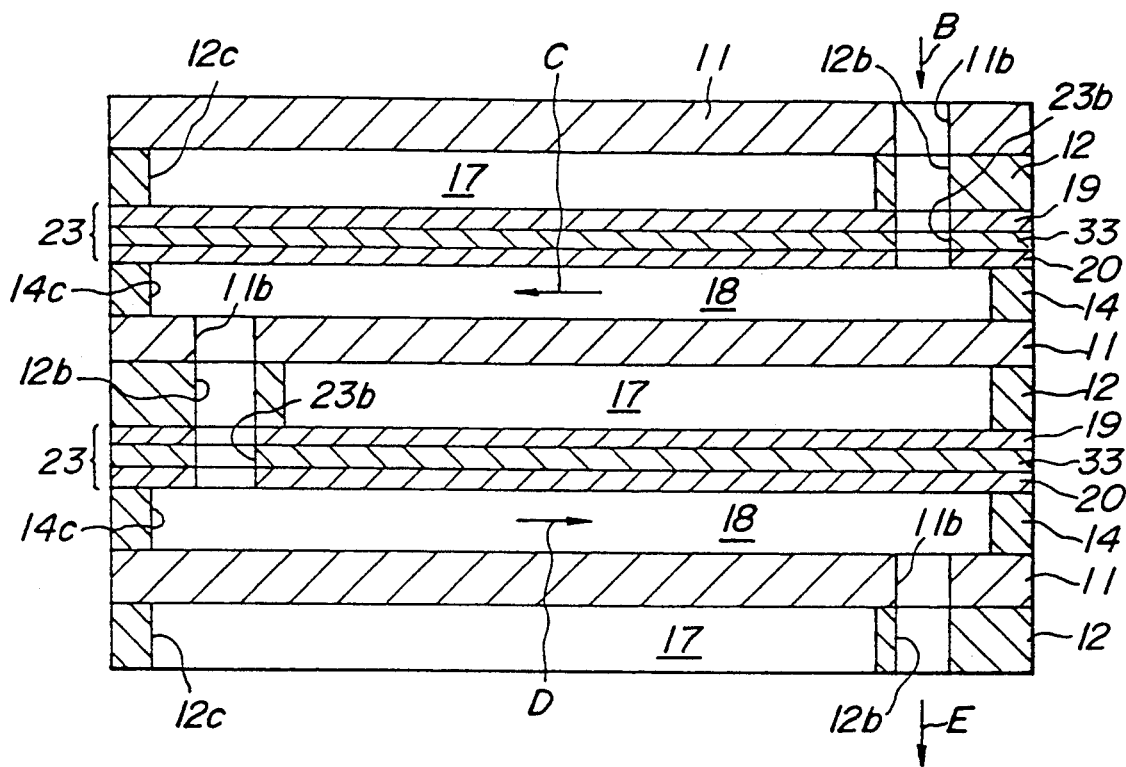
FIG_5

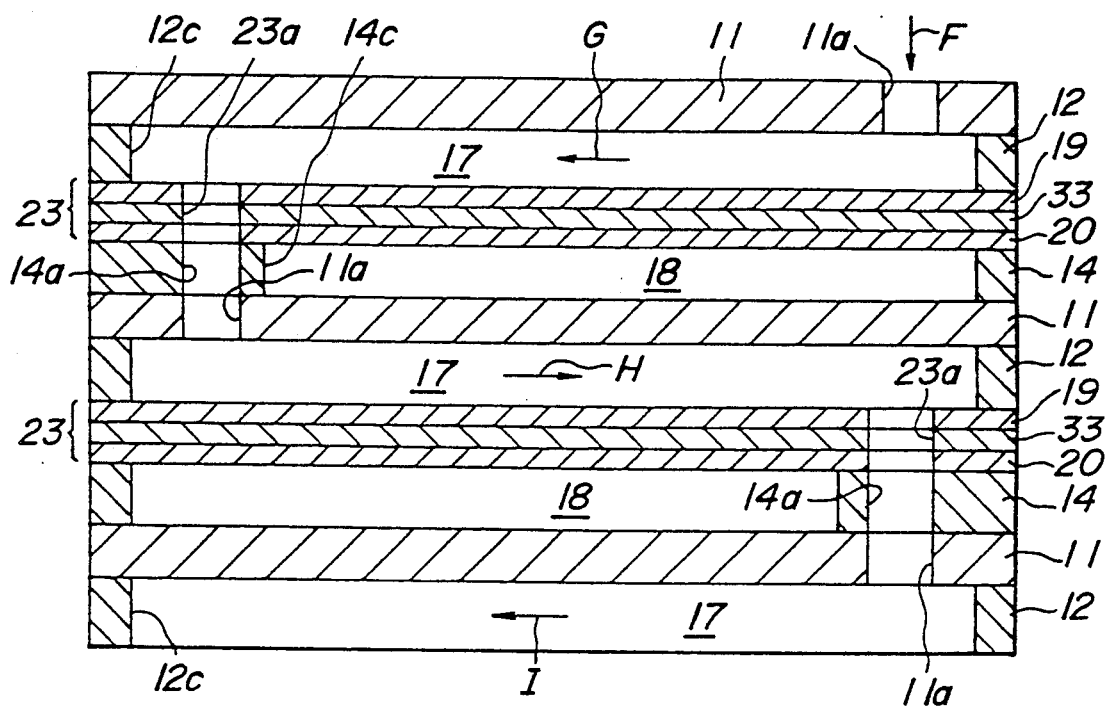
FIG_6

SOLID OXIDE FUEL ELECTRODES AND PROCESS FOR PRODUCING THE SAME

BACKGROUND OF THE INVENTION

1. Field of the Invention

The present invention relates to solid oxide fuel cells which generate electric power by the use of a flat plate-shaped solid oxide fuel cell element and a process for producing the same.

2. Related Art Statement

Recently, fuel cells have been noted as power generating devices. The fuel cell is device capable of directly converting chemical energy possessed by fuel to electric energy. Since the fuel cell is free from limitation of Carnot's cycle, the cell is a very promising technique owing to its high energy conversion efficiency, wide latitude of fuels to be used (naphtha, natural gas, methanol, coal reformed gas, heavy oil and the like), less public nuisance, and high electric power generating efficiency without being affected by scale of installation.

Particularly, since the solid electrolyte fuel cell (hereinafter referred to as "SOFC") operates at high temperatures of 1,000° C. or so, activity of electrodes is very high. Thus, no catalyst of a noble metal such as expensive platinum is necessary. In addition, since the SOFC has low polarization and relatively high output voltage, its energy conversion efficiency is conspicuously much higher than those of the other fuel cells. Furthermore, since their constituent materials are all solid, the SOFC is stable and has long service life.

Since such fuel cells can be constructed by solid structural materials, various types of cell structures have been proposed. So-called flat plate-shaped solid oxide fuel cells are structurally very promising among them because their electric power per unit volume can be easily increased.

With the flat plate-shaped SOFC and monolithic SOFC, however, there are problems in production techniques and the like as follows.

An ion-conductive film of zirconia has been formed on a flat plate-shaped porous support by means of chemical vapor deposition (CVD), physical vapor deposition (PVD) or electrochemical vapor deposition (EVD). However, apparatuses for use in CVD, PVD and EVD are generally expensive and are large in scale. Moreover, film forming speed is low so that these methods are low in productivity and not suitable for mass production and it is difficult to obtain films of wide areas. Furthermore, internal resistance in the cells is high owing to diffusion resistance of fuel gases passing through porous supports.

A method has been proposed to form corrugated green sheets of an ion-conductive film of zirconia, an air electrode film and a fuel electrode film, press contact these green sheets and sinter them. In this method, however, since green sheets of different materials are sintered together, it is difficult to adjust their shrinkages during firing. Further, when the green sheets are press contacted with one another, the green sheets are likely to be cracked or fractured. Moreover, insulating layers tend to be produced at interfaces between the ion-conductive film and the electrode films after they are sintered together.

In order to overcome these problems, Japanese Patent Application Laid-open No. 1-128,359 disclosed a method in which an ion-conductive plate of zirconia is formed by sintering, electrodes are formed on both surfaces thereof to form a flat plate-shaped SOFC element, and such SOFC elements and insulating spacers are alternately laminated to form a SOFC.

However, the inventors' investigations revealed that these methods involved the following problems.

That is, columnar conductors have to be used to electrically connect the flat plane-shaped SOFC elements in parallel. Each of the columnar conductors contacts each air electrode or each fuel electrode at one location. Therefore, since electric current flows to this contact location between the conductor from the entire surface of each air electrode or fuel electrode along and in parallel to the filmy air electrode or filmy fuel electrode, electric resistance and voltage loss are very large when considered with respect to the entire SOFC. Further, since the diametrically round sectional area of the columnar conductor cannot be increased beyond a given value from the standpoint of the structure of the SOFC, the cross sectional area of the conductor is relatively small. Owing to this, particularly when the conductor is long, voltage loss is considerably great. Further, since the flat plane-shaped SOFC elements are connected in parallel, voltage available is today about 1 V at the maximum even by increasing the number of the elements. Thus, the parallel connection type SOFC is not practical.

SUMMARY OF THE INVENTION

It is an object of the present invention to provide a solid oxide fuel cell and a process for producing the same, characterized in that the solid oxide fuel cell has a simple structure and is easy to assemble, any large scale apparatus such as in CVD or PVD is unnecessary, productivity is high, voltage loss in an air electrode film and/or a fuel electrode film is low, SOFC elements can be easily connected in series, and voltage loss at connecting portions in case of series connection can be reduced.

In order to attain the above object, the present invention is to provide the solid oxide fuel cell including a separator plate made of a material having oxidation resistance, reduction resistance and electronic conductivity, an air electrode spacer made of a material having oxidation resistance and electronic conductivity, a flat plate-shaped solid oxide fuel cell element, a fuel electrode spacer made of a material having reduction resistance and electronic conductivity, and another separator plate made of a material having oxidation resistance, reduction resistance and electronic conductivity, the spacer plate, the air electrode spacer, the flat plate-shaped solid oxide fuel cell element, the fuel electrode spacer and another separator plate are successively laminated in this order. The solid oxide fuel cell element includes an ion-conductive ceramic plate, and an air electrode and a fuel electrode formed on opposite surfaces of the ion-conductive ceramic plate, respectively. An oxidizing gas chamber is defined by the separator plate, the air electrode spacer and the element, and a fuel gas chamber is defined by the element, the fuel electrode spacer and another separator plate.

The present invention further provides the process for producing such a solid oxide fuel cell, comprising the steps of forming an ion-conductive ceramic plate by sintering, forming an air electrode on one surface of the ion-conductive ceramic plate, and forming a fuel electrode on the other surface of the ion-conductive ceramic plate. According to the present invention, the above solid oxide fuel cell may be produced by separately preparing the separator plates, the air electrode spacers, and the fuel electrode spacers by sintering, and bonding the air electrode spacer and fuel electrode spacer to opposite surfaces of each of the separator plates with an electronic conductive bonding layer, and then assembling the separator plates to which the air electrode spacer and the fuel electrode spacer are bonded, and the solid oxide fuel cell elements.

According to the present invention (FIG. 1), since the main components such as spacers 2 and 4, the separator plate 1 and the ion-conductive ceramic plate 13 have flat plate-shapes, they can be produced by a conventional shaping method such as tape-casting method or press-forming method. Therefore, these components can be easily produced with low costs, without requiring apparatuses on a large scale as in chemical vapor deposition (CVD) or electrochemical vapor deposition (EVD). Particularly, since the ion-conductive ceramic plate 13 needs no CVD, EVD or the like for its production, the productivity is high and it is possible to produce ion-conductive ceramic plates 13 having wider areas.

Moreover, a plurality of SOFC elements 3 can be easily connected in series only by laminating the separator plates, the air electrode spacers, the flat plate-shaped SOFC elements, and the fuel electrode spacers.

Furthermore, since electric current is caused to be collected through the spacers and the separators themselves without requiring any particular current collector for connecting the SOFC elements 3, the electric current flows through all over the contact surfaces of the components. Thus, resistances at the connection portions are low, resulting in less voltage drop. Moreover, it is possible to enlarge the contact surface between the air electrode 9 and the spacer 2 and that between the fuel electrode 10 and the spacer 4. Further, distances are short, through which the electric current flows within the films of the air electrode 9 and the fuel electrode 10 in parallel to and along the films. Consequently, the voltage loss inside the flat plate-shaped SOFC element 3 is greatly reduced by these synergistic effects.

Moreover, since a porous support member is not used for the flat plate-shaped SOFC element, the electric resistance is lower by that of such a support member.

Further, since, the materials of the separator plate, the air electrode spacer and the fuel electrode spacer can be most suitably selected from the standpoint of the structure in consideration of the electronic conductivity and the resistance to the respective atmospheres, the internal resistance of the entire stack can be restrained to a low value.

Furthermore, the internal resistance and structural strength of the stack can be optimized by properly changing the thicknesses of the separator plate 1 and the spacers.

In addition, when the above SOFC is to be produced, it is preferable that after the ion-conductive ceramic plate is prepared by sintering, the air electrode is formed on one surface of the ion-conductive ceramic plate, and the fuel electrode is formed on the other surface of the ion-conductive ceramic plate. By so doing, no insulating layer is formed between the ceramic plate and the air electrode or the fuel electrode.

Moreover, it is preferable that after a separator plate, an air electrode spacer and fuel electrode spacer are separately produced by sintering, the air electrode spacer and the fuel electrode spacer are bonded to opposite surfaces of the separator plate by means of an electronic conductive bonding layer. In this case, it becomes possible to sinter the separator plate and the spacers under the optimum conditions commensurate with the respective materials of these components.

These and other objects, features and advantages of the invention will be appreciated upon reading the following description of the invention when taken in conjunction with the attached drawings, with the understanding that some modifications, variations and changes of the same could be made by the skilled person in the art to which the invention pertains without departing from the spirit of the invention or the scope of the claims appended hereto.

BRIEF DESCRIPTION OF THE ATTACHED DRAWINGS

For a better understanding of the invention, reference is made to the attached drawings, wherein:

FIG. 5 is a sectional view of the SOFC taken along a line V—V in FIG. 4; and

FIG. 6 is a sectional view of the SOFC taken along a line VI—VI in FIG. 4.

DETAILED DESCRIPTION OF THE INVENTION

The present invention will be explained in more detail with reference to the attached drawings:

Next, the process for laminating the constituent parts of the SOFC will be explained.

Figure 2:
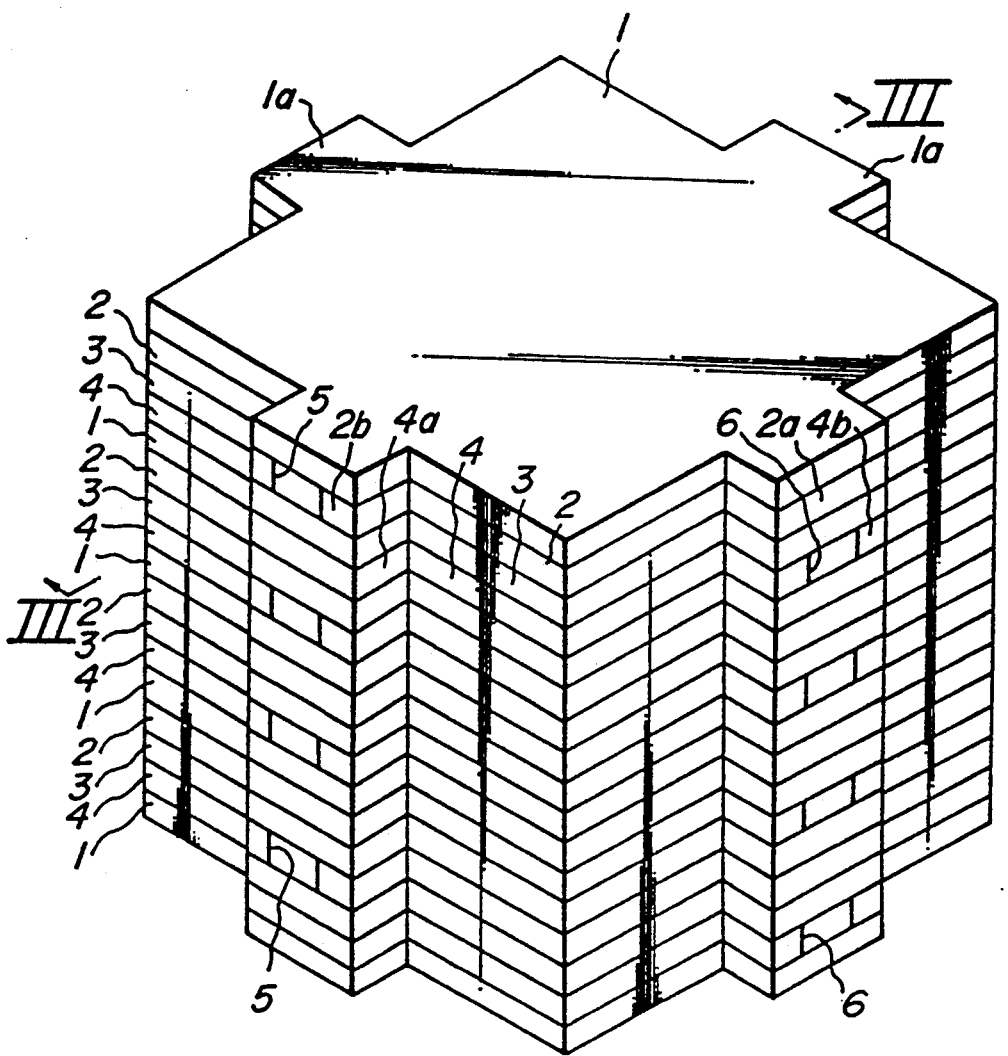
FIG. 2 is a perspective view illustrating the SOFC composed of the components shown in FIG. 1.

As a first process, an entire stack is co-sintered. That is, green sheets for ion-conductive ceramic sheets 13 are shaped, and a paste for an air electrode 9 and a paste for a fuel electrode 10 are applied onto the opposite surfaces of each of the thus prepared green sheets, respectively. Green sheets for separator plates 1, air electrode spacers 2 and fuel electrode spacers 4 are shaped. Then, after these green sheets are laminated and closely adhered together under pressure as shown in FIG. 2, the sheets are co-sintered under given conditions. Since this process needs a single sintering step only, the process is very simple. To the contrary, since each type of the green sheets has different firing temperature and conditions, the constituent parts cannot be sintered under their optimum conditions. Particularly, an insulating layer may be formed at an interface between the ion-conductive ceramic plate 13 and the electrode 9 or 10.

In view of the above, it is preferable that after the ion-conductive ceramic plate 13 is prepared by sintering, the air electrode 9 is formed on one of the surfaces of the ion-conductive ceramic plate, and the fuel electrode 10 is formed on the other surface of the ion-conductive ceramic plate. Thereby, the SOFC element is formed. In this case, no insulating layer is formed at the interface. In order to assemble the SOFC, the separator plates, the air electrode spacer, and the fuel electrode spacer are separately prepared by sintering, and then these constituent parts are laminated together with the above SOFC element with an electronic conductive bonding layer in between these parts.

In this case, the SOFC elements are each produced by preparing the ion-conductive ceramic plate by sintering, and forming the air electrode and the fuel electrode on the opposite surfaces of the ion-conductive ceramic plate, and then the spacer plates to which the air electrode spacer and the fuel electrode spacer are bonded, and the SOFC elements are assembled together by using the electronic conductive bonding layer as shown in FIG. 2. As to the uppermost separator plate, it has no fuel electrode spacer. On the other hand, the lowermost separator plate has no air electrode spacer.

Since the components of the stack shown in FIG. 2 are all in the form of flat plates, they can be easily formed by tape-casting, press-forming, and doctor blade methods. In order to obtain green sheets of a predetermined configuration, it is necessary to punch a raw green sheet.

Following materials are preferable as the electronic conductive bonding layer.

Figure 4:
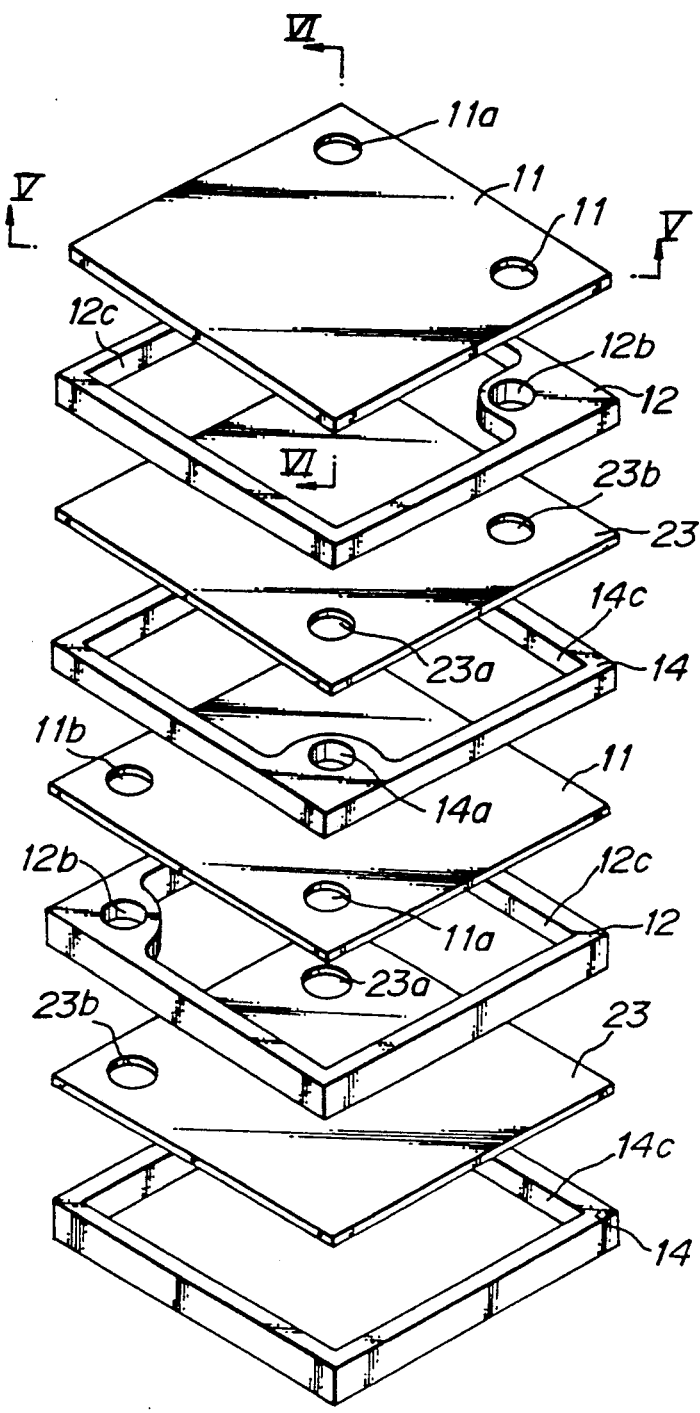
FIG. 4 is an exploded perspective view illustrating another embodiment of the SOFC according to the invention.

(1) Paste of Pt, Pd, Ag-Pd, Au or Ni
(2) Paste of $LaMnO_3$, $LaCrO_3$ or $LaCoO_3$ FIG. 4 illustrates a part of the SOFC of another embodiment according to the invention in an exploded perspective view. FIGS. 5 and 6 are sectional views of the SOFC taken along lines V—V and VI—VI in FIG. 4, respectively.

First, a square separator plate 11 is arranged in the uppermost portion. The separator plate 11 is made of a material which has oxidation resistance, reduction resistance, and electronic conductivity. The plate 11 may be actually formed by the same material and in the same manner as explained with respect to the above separator plate 1. The separator plate 11 is formed with a circular oxidizing gas opening 11a and a circular fuel gas opening 11b.

An air electrode spacer 12 is laminated on the underside of the separator plate 11. The spacer 12 is formed with a substantially square punched portion 12c convexed at its one corner where a fuel gas opening 12b is formed. The air electrode spacer 12 is made of a material having oxidation resistance and electronic conductivity. The space 12 may be actually formed by the same material and in the same manner as explained with respect to the air electrode spacer 2.

A flat plate-shaped SOFC element 23 is laminated on the underside of the air electrode spacer 12. The element 23 is formed with a circular oxidizing gas opening 23a and a circular fuel gas opening 23b. In more detail, the flat plate-shaped ion-conductive ceramic plate 33 of the SOFC element 23 is formed with an air electrode 19 and a fuel electrode 20 on upper and lower surfaces, respectively. The material and the producing process of the flat plate-shaped SOFC element are the same as those of the flat plate-shaped SOFC element 3 shown in FIG. 1.

A fuel electrode spacer 14 is laminated on the underside of the flat plate-shaped SOFC element 23. The spacer 14 is formed with a substantially square punched portion 14c convexed at its one corner where an oxidizing gas opening 14b is formed. The fuel electrode spacer 14 is made of a material which has reduction resistance and electronic conductivity. The spacer 14 may be actually formed by the same material and in the same manner as explained in connection with the fuel electrode spacer 4.

On the underside of the fuel electrode spacer 14 are laminated a separator plate 11, an air electrode spacer 12, a flat plate-shaped SOFC element 23 and a fuel electrode spacer 11. Further components are laminated in the same manner. A separator plate 11 is located at the lowermost end of the stack. Electric power can be taken out by connecting a load between the separator plates 11 at the upper and lower ends.

In the laminated SOFC (stack), an oxidizing gas chamber 17 is defined by the separator plate 11, the air electrode spacer 12 and the flat plate-shaped SOFC element 23 as shown in FIGS. 5 and 6. On the other hand, a fuel gas chamber 18 is defined by the separator plate 11, the fuel electrode spacer 14 and the flat plate-shaped SOFC element 23. In this case, the oxidizing gas chamber 17 corresponds to the punched portion 12c of the air electrode spacer 12 in disassembled state of the SOFC, while the fuel gas chamber 18 corresponds to the punched portion 14c of the fuel electrode spacer 14. Of course, the air electrode 19 faces to the oxidizing gas chamber 17, while the fuel electrode 20 faces to the fuel gas chamber 18.

Next, the flow of the fuel gas will be explained.

When the separator plates 11, the spacers 12 and 14 and the flat plate-shaped SOFC elements 23 are laminated, the fuel gas openings 11b, 12b and 23b are vertically aligned and communicated with each other as shown in FIG. 5. The fuel gas opening 12b is separated from the oxidizing gas chamber 17. In FIG. 5, the fuel gas openings 11b, 12b and 23b are located on the right side in the first stack, on the left side in the second stack, and on the right side in the third stack. They are located in the same manner in the following stacks.

In operating the SOFC, a fuel gas is supplied thereinto as shown in an arrow B. The fuel gas flows through the fuel gas openings 11b, 12b and 23b into the fuel gas chamber 18 in which the fuel gas flows as shown by an arrow C. After arriving at the left end of the fuel gas chamber 18, the fuel gas again flows through the fuel gas openings 11b, 12b and 23b at the left side of the stack into the fuel gas chamber 18 in which the fuel gas flows as shown by an arrow D. Thereafter, the fuel gas arrives at the right hand end of the fuel gas chamber 18 and flows through the fuel gas openings 11b and 12b as shown by an arrow E. The fuel gas continues to flow from the upper end to the lower end of the SOFC.

Next, the flow of the oxidizing gas will be explained.

When the separator plates 11, the spacers 12 and 14, and the flat plate-shaped SOFC elements 23 are laminated, the oxidizing gas opening 11a, 14a and 23a are vertically aligned and communicated with each other as shown in FIG. 6. The oxidizing gas opening 14a is separated from the fuel gas chamber 18. In FIG. 6, the oxidizing gas opening 11a is located on the right side in the uppermost separator plate 11. The vertically aligned oxidizing gas openings 23a, 14a and 11a are located on the left side in the first stack, on the right side in the second stack, and on the left side in the third stack. They are located in the same manner in the following stacks.

In operating the SOFC, an oxidizing gas is supplied thereinto as shown by an arrow F. The oxidizing gas flows through the fuel gas opening 11b into the oxidizing gas chamber 17 in which the oxidizing gas flows as shown by an arrow G. After arriving at the left end of the oxidizing gas chamber 17, the oxidizing gas flows through the oxidizing gas openings 23a, 14a and 11a into the oxidizing gas chamber 17 in which the oxidizing gas flows as shown by an arrow H. Thereafter, the oxidizing gas arrives at the right hand end of the oxidizing gas chamber 17 and flows through the oxidizing gas openings 23a, 14a and 11a in the oxidizing gas chamber 17 as shown by an arrow I. The oxidizing gas continues to flow from the upper end to the lower end of the SOFC in this manner.

Figure 1:
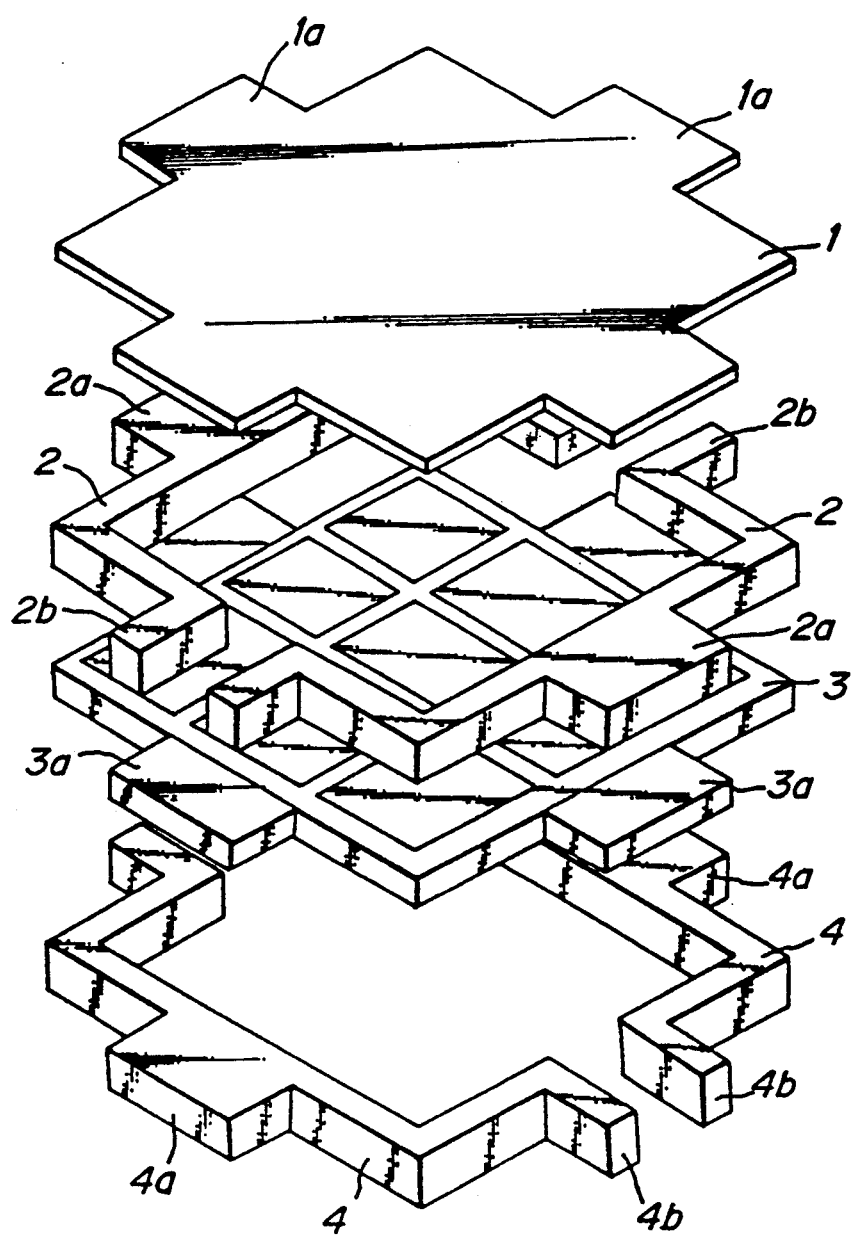
FIG. 1 is an exploded perspective view illustrating one embodiment of the SOFC according to the invention.
Figure 3:
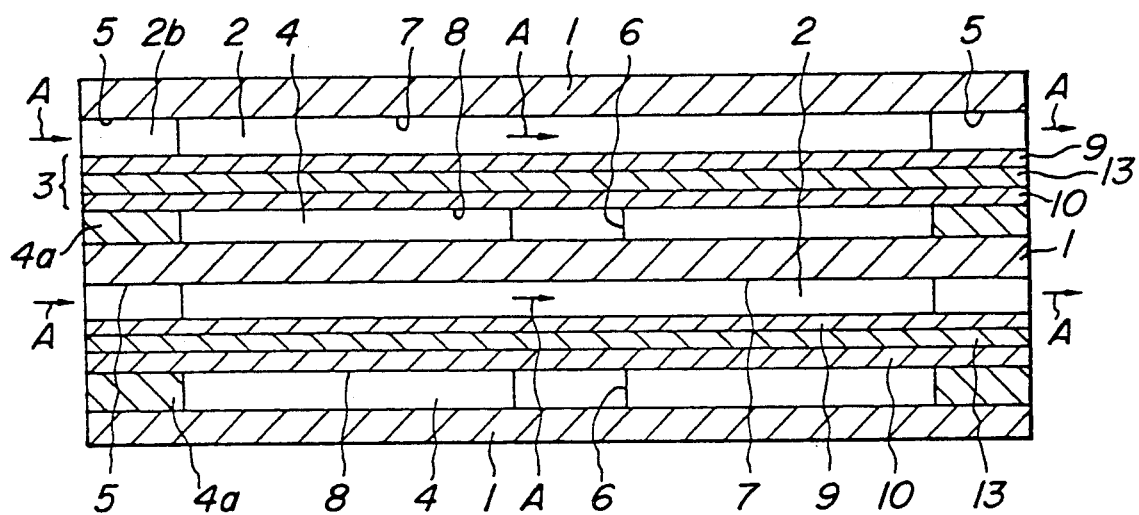
FIG. 3 is a sectional view of the SOFC taken along a line III—III in FIG. 2.

Moreover, since the separator plates 11, the air electrode spacers 12, the flat plate-shaped SOFC elements 23 and the fuel electrode spacers 14 are successively laminated to form the stacks in this embodiment, the effects explained with the SOFC shown in FIGS. 1 to 3 can be also accomplished. Further, these components can be laminated in the similar manner to that of the SOFC shown in FIGS. 1 to 3.

In addition, the fuel gas is caused to flow from the upper end to the lower end of the SOFC without requiring separate supply of the fuel gas to every fuel gas chamber 18. Therefore, the fuel gas supply mechanism can be largely simplified, and sealing can be easily effected to prevent leakage of the fuel gas. The same effects can be also achieved with respect to the flowing of the oxidizing gas. Moreover, the fuel gas and the oxidizing gas are caused to flow diagonally across the substantially square fuel gas chamber 18 and the oxidizing gas chamber 17 in the arrow directions C and D, and G, H and I, respectively. Accordingly, it is easy to supply the fuel gas and oxidizing gas uniformly all over the surfaces of the fuel and air electrode 20 and 19.

It is more preferable that the fuel gas does not directly contact the walls of the fuel gas openings 11b, 12b and 23b in the embodiment shown in FIGS. 4 to 6. For this purpose, a fuel gas conduit is formed from a material which is at least reduction-resistant, and this fuel gas conduit is fitted in the fuel gas openings 11b, 12b and 23b so that the fuel gas flows in the internal space of the fuel gas conduit without directly contacting the fuel gas openings.

It is also more preferable that the oxidizing gas does not directly contact the walls of the oxidizing gas openings 23a, 14a and 11a. For this purpose, an oxidizing gas conduit is formed from a material which is at least oxidation-resistant, and this oxidizing gas conduit is fitted in the oxidizing gas openings 23a, 14a and 11a so that the oxidizing gas flows in the internal space of the oxidizing gas conduit without directly contacting the oxidizing gas openings.

In the above embodiments, each of the SOFC stacks may be turned upside down. Moreover, the SOFC stacks may be supported in the horizontal direction.

While each of the spacers 2 and 4 is divided into two parts in the embodiment shown in FIGS. 1 to 3, they may be divided into three or more parts.

In the above embodiments, the planar configurations of the components of the SOFC may be changed in various ways. Moreover, the oxidizing gas openings 5, 23a, 14a and 11a and the fuel gas openings 6, 11b, 12b and 23b may have cross-sections other than the circular cross-sections. Moreover, the numbers of these openings may be increased.

In the embodiment of FIG. 4, the second separator plate 11 is rotated by 180° from the position of the first separator plate 11. However, the second separator plate 11 may be positioned rotated by 90° relative to the uppermost separator plate 11. Other components must be course be positionally adjusted to the separator plates 11 at the same time.

What is claimed is:

1. A solid oxide fuel cell comprising:
 a flat solid oxide fuel cell element comprising an ion-conductive ceramic plate, an air electrode formed on a first main surface of said ion-conductive ceramic plate and a fuel electrode formed on a second main surface of said ion-conductive ceramic plate;
 a flat air electrode spacer laminated on said first main surface of said ion-conductive ceramic plate, said air electrode spacer being made of a material having oxidation resistance and electronic conductivity;
 a first flat separator plate laminated on said air electrode spacer, said first separator plate being made of a material having oxidation resistance, reduction resistance and electronic conductivity;
 an oxidizing gas chamber defined by said first separator plate, said air electrode spacer and said solid oxide fuel cell element;
 a flat fuel electrode spacer laminated on said second main surface of said ion-conductive ceramic plate, and fuel electrode spacer being made of a material having reduction resistance and electronic conductivity;
 a second flat separator plate laminated on said fuel electrode spacer, said second separator plate being made of a material having oxidation resistance, reduction resistance and electronic conductivity; and
 a fuel gas chamber defined by said second separator plate, said fuel electrode spacer and said solid oxide fuel cell element.

2. The solid oxide fuel cell of claim 1, further comprising electron conductive bonding layers at interfaces between (i) said solid oxide fuel cell element and each of said air and fuel electrode spacers, (ii) said air electrode spacer and said first separator plate, and (iii) said fuel electrode spacer and said second separator plate.

3. The solid oxide fuel cell of claim 1, wherein said air electrode spacer is laminated on peripheral portions of said first main surface of said ion-conductive ceramic plate, and said fuel electrode spacer is laminated on peripheral portions of said second main surface of said ion-conductive ceramic plate.

4. The solid oxide fuel cell of claim 1, wherein said first and second separator plates are square flat plates whose four sides are formed with rectangular projections, respectively, each of said air electrode spacer and said fuel electrode spacer has a substantially U-shaped form including a pair of aligned projections outwardly extending from ends of legs of the U-shaped form and a rectangular projection outwardly extending from a bottom of the U-shaped form, and said solid oxide fuel cell element is a square flat plate whose four sides are formed with rectangular projections to conform with the projections of the separator plates and the spacers.

5. The solid oxide fuel cell of claim 1, wherein said first and second separator plates are substantially square flat plates each formed with an oxidizing gas opening and a fuel gas opening, respectively, said air electrode spacer is a substantially square flat plate formed with a substantially square punched portion convexed at its corner where a fuel gas opening is formed, said solid oxide fuel cell element is a square flat plate formed with an oxidizing gas opening and a fuel gas opening, and said fuel electrode spacer is substantially a square flat plate formed with a substantially square punched portion convexed at its corner where an oxidizing gas opening is formed, said oxidizing gas opening and said fuel gas opening of the fuel element being in conformity with said oxidizing gas opening of the air electrode spacer and said fuel gas opening of the fuel electrode spacer, respectively.

6. A process for producing a solid oxide fuel cell comprising the steps of:

forming a flat ion-conductive ceramic plate;

sintering said ceramic plate;

forming an air electrode on a first main surface of said ion-conductive ceramic plate;

forming a fuel electrode on a second main surface of said ion-conductive ceramic plate, whereby said ion-conductive ceramic plate, said air electrode and said fuel electrode define a flat solid oxide fuel cell element;

laminating a flat air electrode spacer on said first main surface of said ion-conductive ceramic plate, said air electrode spacer being made of a material having oxidation resistance and electronic conductivity;

laminating a first flat separator plate on said air electrode spacer, whereby said first separator plate, said air electrode spacer and said solid oxide fuel cell element define an oxidizing gas chamber, said first separator plate being made of a material having oxidation resistance, reduction resistance and electronic conductivity;

laminating a flat fuel electrode spacer on said second main surface of said ion-conductive ceramic plate, said fuel electrode spacer being made of a material having reduction resistance and electronic conductivity; and laminating a second flat separator plate on said fuel electrode spacer, whereby said second separator plate, said fuel electrode spacer and said solid oxide fuel cell element define a fuel gas chamber, said second separator plate being made of a material having oxidation resistance, reduction resistance and electronic conductivity.

7. A process for producing a stacked solid oxide fuel cell, comprising the steps of:

forming a plurality of flat ion-conductive ceramic plates;

sintering the ion-conductive ceramic plates;

forming an air electrode on a first main surface of each ion-conductive ceramic plate;

forming a fuel electrode on a second main surface of each ion-conductive ceramic plate, thereby providing a plurality of flat solid oxide fuel cell elements each defined by said ion-conductive ceramic plate, said air electrode and said fuel electrode;

forming a plurality of flat separator plates by sintering, said separator plates being made of a material having oxidation resistance, reduction resistance and electronic conductivity;

forming a plurality of flat air electrode spacers by sintering, said air electrode spacers being made of a material having oxidation resistance and electronic conductivity;

forming a plurality of flat fuel electrode spacers by sintering, said fuel electrode spacers being made of a material having reduction resistance and electronic conductivity;

bonding an air electrode spacer and a fuel electrode spacer to opposite surfaces of each separator plate with a layer of electron conductive bonding material; and laminating, in alternating order, said separator plates to which the air electrode spacer and the fuel electrode spacer are bonded, and solid oxide fuel cell elements to form a stacked solid oxide fuel cell.

* * * * *